United States Patent [19]

Carl

[11] 4,409,477
[45] Oct. 11, 1983

[54] SCANNING OPTICAL SYSTEM

[75] Inventor: Norman J. Carl, La Habra, Calif.

[73] Assignee: Sanders Associates, Inc., Nashua, N.H.

[21] Appl. No.: 276,279

[22] Filed: Jun. 22, 1981

[51] Int. Cl.³ ............................. G02B 5/14; H01J 3/14
[52] U.S. Cl. .................................. 250/227; 250/236; 350/96.24
[58] Field of Search ............................. 250/234–236, 250/201–202, 227; 350/96.24

[56] References Cited

U.S. PATENT DOCUMENTS

| | | | |
|---|---|---|---|
| 4,203,672 | 5/1980 | Smith, Jr. ........................ | 250/235 X |
| 4,214,157 | 7/1980 | Check, Jr. et al. ................. | 250/236 |
| 4,222,630 | 9/1980 | Delignieres ..................... | 350/96.24 |
| 4,256,959 | 3/1981 | Monette .......................... | 250/235 |
| 4,352,550 | 10/1982 | Uchida ......................... | 350/96.24 X |

*Primary Examiner*—David C. Nelms
*Assistant Examiner*—Edward P. Westin
*Attorney, Agent, or Firm*—Louis Etlinger; William F. Porter, Jr.

[57] ABSTRACT

A scanning system providing a linear scanning beam utilizing a fiber optic bundle, one end of which forms a circle which is scanned by a light beam and the other of which forms a straight line. Other fibers are within and external to the circle formed by the one end of the fiber optic bundle and are used to provide a feedback signal used to correct the scanning light beam to impinge only on the fiber ends of the one end of the bundle.

6 Claims, 6 Drawing Figures

SCANNING OPTICAL SYSTEM

FIELD OF THE INVENTION

This invention relates to a scanning device capable of providing a linear scanning line on a flat surface.

BACKGROUND OF THE INVENTION

In the prior art the problem of linearly scanning a flat surface with a light beam is most commonly solved by utilizing a stationary collimated light source, lenses, rotating polygonal mirrors and other oscillating mirrors to deflect the collimated light beam over the flat surface. There are problems with this common approach and it is relatively complex and expensive. For example, multiple lenses are utilized to expand the collimated light beam and then to focus the collimated light beam, as well as to perform other manipulations of the light beam before it is scanned across the flat surface. In addition, a motor drive is typically used to rotate the multi-faced polygonal mirror, which motor is subject to mechanical wear and often has relatively complex circuitry associated therewith to exactly regulate the motor speed.

The position of mirrors and lenses with respect to the rotating polygonal mirror must also be very carefully adjusted to assure that the collimated light beam is caused to impinge upon a reflecting mirror surface disposed parallel to the rotation axis of the reflecting surface of the polygonal mirror from a finite angle with respect to a plane crossing both the rotation axis and the reflecting mirror at right angles therewith. Upon any deviation therefrom, the beam reflected from the polygonal mirror assumes a conical shape which requires further correction.

The prior art multi-faced polygonal mirror that is rotated via a motor and used to reflect the collimated light beam to produce the scanning beam must also be carefully made in order to achieve linear scanning. This is relatively difficult and costly. When the accuracy of dividing the polygonal surfaces used for deflecting the collimated light beam is not high, difficulties arise regarding timing the commencement of scanning. That is, synchronizing the time at which every scanning line should commence. When a modulated scanning beam is deflected by inaccurately finished polygonal surfaces of such a polygonal mirror, the position of each scanning line is displaced relative to the direction of scanning according to the angular error in the associated surface of the polygon. This distortional error is called "jitter". The manufacture of polygonal mirrors having high accuracy is very difficult and particularly for polygonal mirrors having a great number of polygonal surfaces. To increase the accuracy of polygonal mirrors deflection systems, relatively complex circuitry is necessary to time the scanning.

SUMMARY OF THE INVENTION

It is an object of the present invention to provide a relatively simple optical system which is capable of providing a linear scanning line.

It is another object of the present invention to provide a scanning device that does not utilize polygonal mirrors and complex lens systems.

It is yet another object of the present invention to provide a scanning device which does not utilize a motor and which does not require complex mechanical alignment.

According to the present invention, there is provided a simple optical system for linearly scanning a light beam on a flat field surface. The system includes a laser functioning with an electro-acoustic modulator, or alternatively, a laser diode which can provide a modulated laser beam, a piezoelectric crystal and mirror arrangement for deflecting the laser beam, a fiber optic and electronic circuit servo arrangement that corrects for laser deflection deviations and a bundle of fiber optics arranged in a fashion to convert the deflected laser beam into an extremely linear, flat field scan.

BRIEF DESCRIPTION OF THE DRAWING

The present invention is best understood upon reading the following specification in conjunction with the drawing in which.

DETAILED DESCRIPTION

Figure 1:
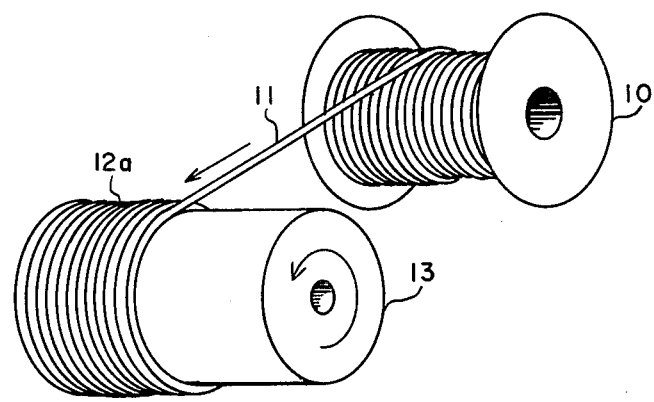
FIG. 1 shows a preliminary step in fabricating a fiber optic bundle used to implement the present invention.

Among the elements used in implementing the present invention are three specially shaped fiber optic bundles, the manufacture of which are now described. In FIG. 1 is shown a spool 10 of fiber optic cable which typically may be 0.003 inch diameter. Optic fiber 11 is unreeled from spool 10 and fastened to one end of drum 13. As drum 13 rotates in a counter clockwise direction, as indicated by the arrow on the drum, optic fiber 11 forms a single layer winding 12a on drum 13. In FIG. 1 there is shown only a partial layer on drum 13, but when drum 13 is entirely covered with one winding layer two or three more single layer windings are wound on top of each other by going back and forth across drum 13. The final thickness is in the order of 0.010 inches. The diameter and length of drum 13 are chosen so that the required dimensions of the finished fiber optic bundle shown in FIG. 3, to be described hereinafter, are met.

Upon completion of the multi-layer optic fiber winding 12a on drum 13, a flexible coating is applied to the winding that holds each turn in the layer relationship. The coating may be applied only along a band parallel to the axis of drum 13, which approach is preferred. Thereafter, optic fiber 11 from spool 10 may be severed. The next step is to slit the single layer winding lengthwise along drum 13 parallel to the axis thereof. When only a band of flexible coating is applied, the cut must be through it so that the optic fiber ends are held in a fixed relationship. The fiber optic bundle is then removed from drum 13. All three fiber optic bundles may be manufactured in this manner.

Figure 2:
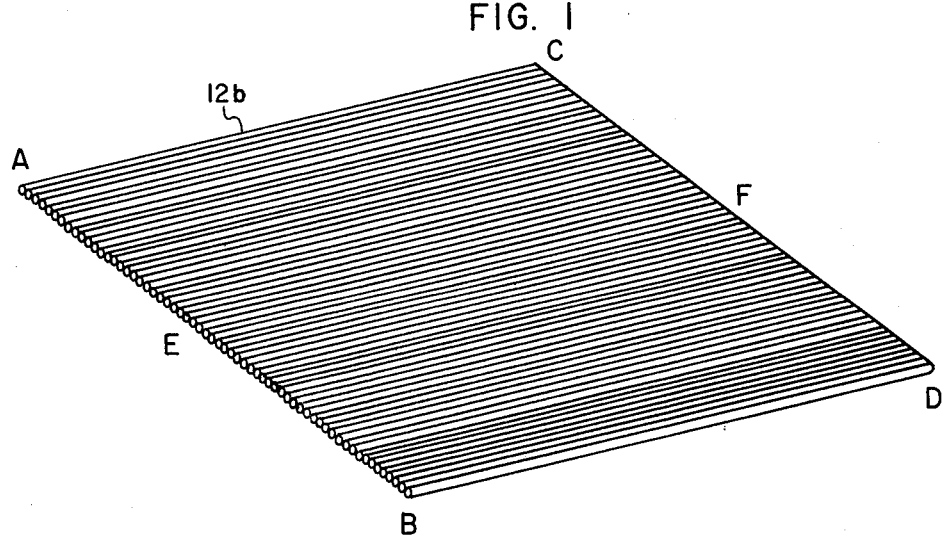
FIG. 2 shows an intermediate step in fabricating the fiber optic bundle used to implement the present invention.
Figure 3:
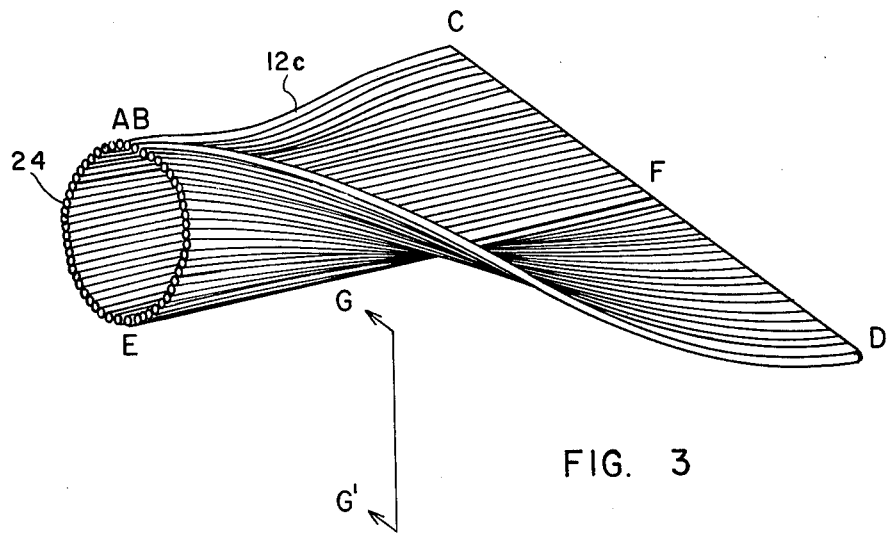
FIG. 3 shows the final form of one of the fiber optic bundles used to obtain a linear scan.

FIG. 2 shows the flexible layer 12b of fiber optic fibers after being slit and removed from the drum 13. Only for simplicity of representation the multiple layer fiber optic bundle wound on drum 13 is not shown, but instead only a single layer as shown in FIGS. 1 through 5. The letters A–F are used to identify particular corners and midpoints of the now flat layer of fiber optic fibers to help understand how the final shaped bundle of fiber optics is formed, as shown in FIG. 3, to implement the present invention.

FIG. 3 shows the final configuration of the one of the three fiber bundles used to provide linear scanning. Starting with the flat orientation of fiber optic fibers as shown in FIG. 2, corners A and B are wrapped around a ring-shaped member, not shown, and fastened to the ring so that end of the fiber optic bundle now forms a circle as shown in FIG. 3. The length of the winding on drum 13 equals the circumference of the circle formed by the bundle end A, E, B wrapped around the ring-shaped member. The diameter of drum 13 equals the length AC of bundle 12b in FIG. 2. In comparing FIGS. 2 and 3, points A, E and B are show for orientation purposes. The flat fiber optic bundle shown in FIG. 2 also has an end, the corners of which are represented by the letters C, F, D. In FIG. 3 these ends of the fiber optic bundle are captured between two flat members, not shown, so that these ends of the fiber optic bundle from a straight line as represented in FIG. 3 by the letters C, F, D. The ends of the fiber optic bundle now formed as shown in FIG. 3 and represented by letters A, E, B and C, F, D, are trimmed and polished in a manner well known in the art. This finishes the fabrication of one end of the three fiber optic bundles, shown in FIG. 3, used to implement the invention as shown in detail in FIG. 4 which is now described.

The other two fiber optic bundles required to implement the invention start as shown in FIG. 2 and one end of each is formed in the same circular manner as is bundle 12c. The other end of the remaining two bundles are not held flat but are bunched together. The assembly of all three fiber optic bundles is shown in FIG. 4.

Figure 4:
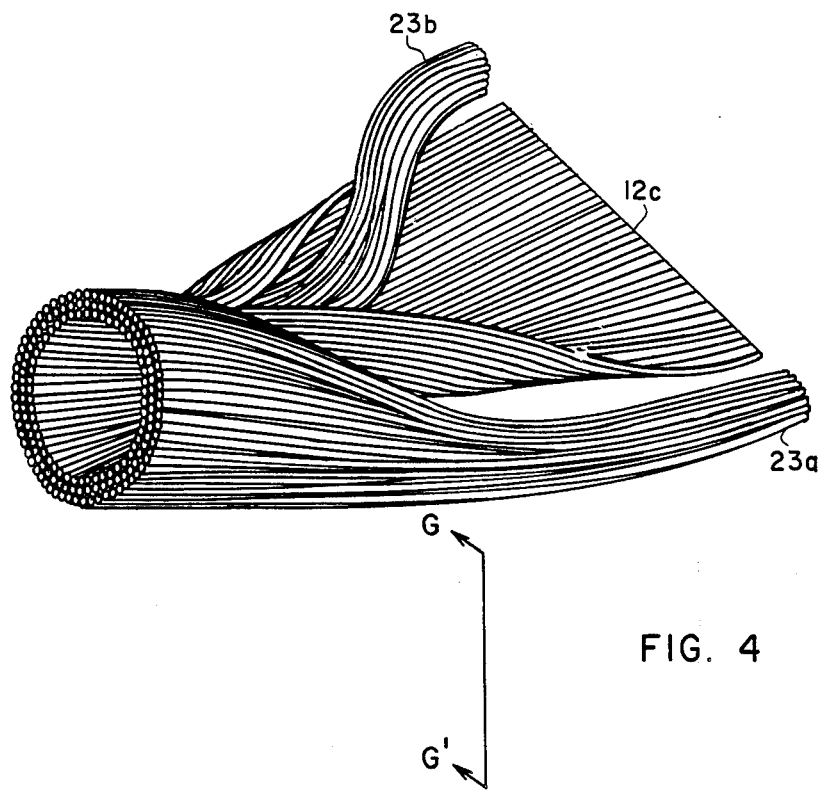
FIG. 4 shows all fiber optic bundles used to practice the present invention.
Figure 5:
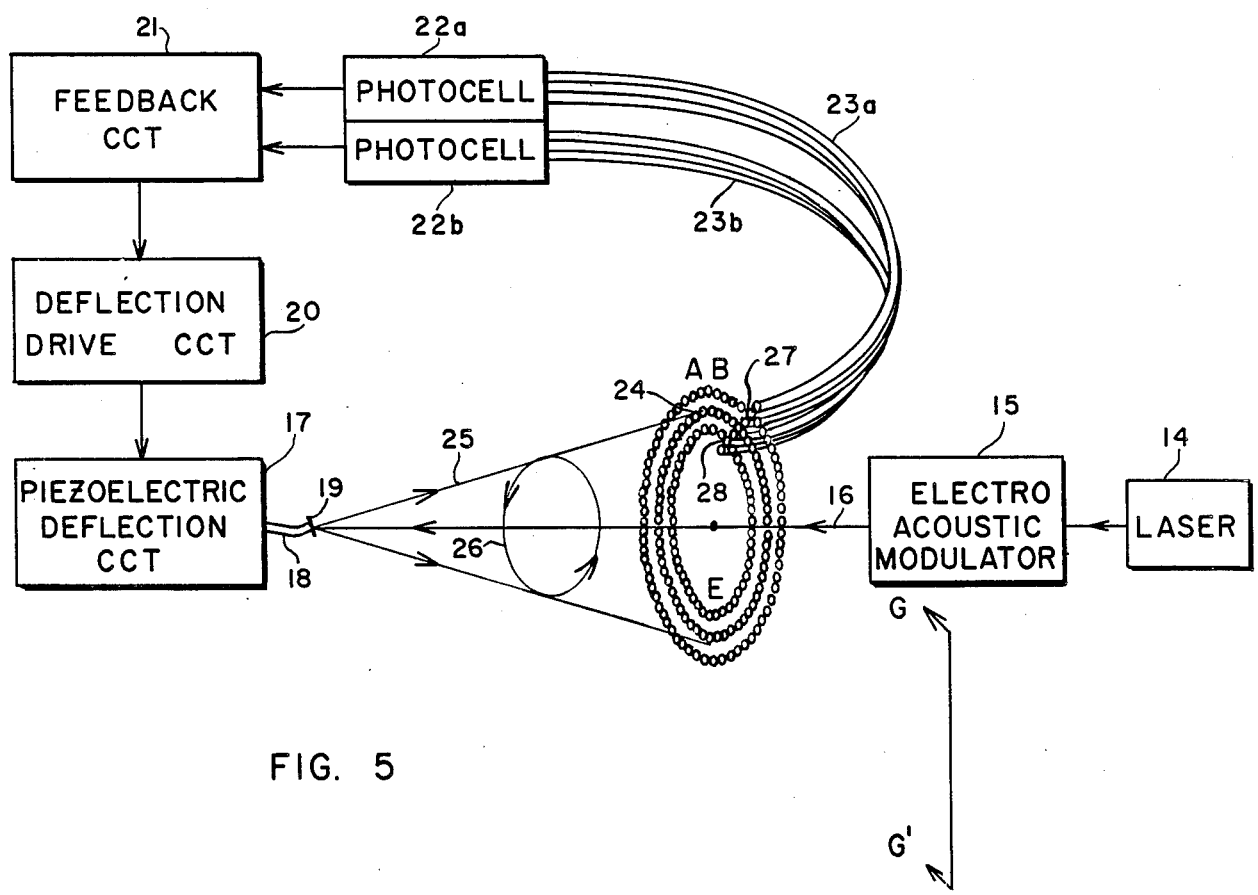
FIG. 5 is a block diagram showing one embodiment of the present invention.

The assembled three bundles shown in FIG. 4 are not shown in FIG. 5 in order not to obscure other elements in FIG. 5. However, on both FIGS. 4 and 5 are shown a view, G, G', parallel to the plane of the ends of the fiber optic fibers forming the ring represented by the letters A, E, B. In FIG. 5 is shown the same view, G, G', as a circle showing only the very ends of the fiber optic fibers formed in the circle A, E, B. The remainder of the assembled fiber optic bundles shown in FIG. 4 are not shown so as not to obscure this figure.

Laser 14 is used to create a collimated beam of light having an approximate diameter of 0.003 to 0.005 inches, which beam is passed through electro-acoustic modulator 15 which is used to intensity modulate the beam for the purposes described further in this specification, such as carrying information. In an alternative a laser diode may be used. The intensity modulated laser beam 16 travels a path which is perpendicular to and passes through the center of the circle formed by the ends of the fiber optic bundle represented by A, E, B.

The deflect the laser light beam 16 piezoelectric deflection circuit 17, piezoelectric drive fiber 18 and a small mirror 19 are utilized. Fiber 18 is a fused silica fiber to the end of which is bonded mirror 19 utilizing an epoxy cement. When a deflection signal generated by deflection drive circuit 20 is applied to piezoelectric deflection circuit 17, fiber 18 is caused to move in a fashion to reflect modulated laser beam 16 that is impinging upon mirror 19 in a conical fashion as represented by ray 25 tracing circle 26. The reflected modulated light beam 25 impinges upon the fiber ends 24 of fiber optic bundle 12c (not shown in further detail in FIG. 5). Reflected light beam 25 scans around the circle formed by the ends 24 of the fiber optic bundle with a constant velocity. Turning briefly to FIG. 3, the modulated light beam 25 impinging upon ends 24 of the fiber optic strands making up fiber optic bundle 12c are converted to a very linear scan as is obvious by the formation of bundle 12c. As the modulated light beam is scanned around the circle formed by the ends 24 of the fiber optic fibers from A to E to B to complete one circular scan, the light beams travel through the fibers of bundle 12c in an extremely linear fashion from C to F to D in the same period of time. In this manner a very linear scan is produced. Typically, the end C, F, D of fiber optic bundle 12c, shown in both FIGS. 3 and 4, are located immediately adjacent to a xerographic drum to implement the xerographic process.

Figure 6:
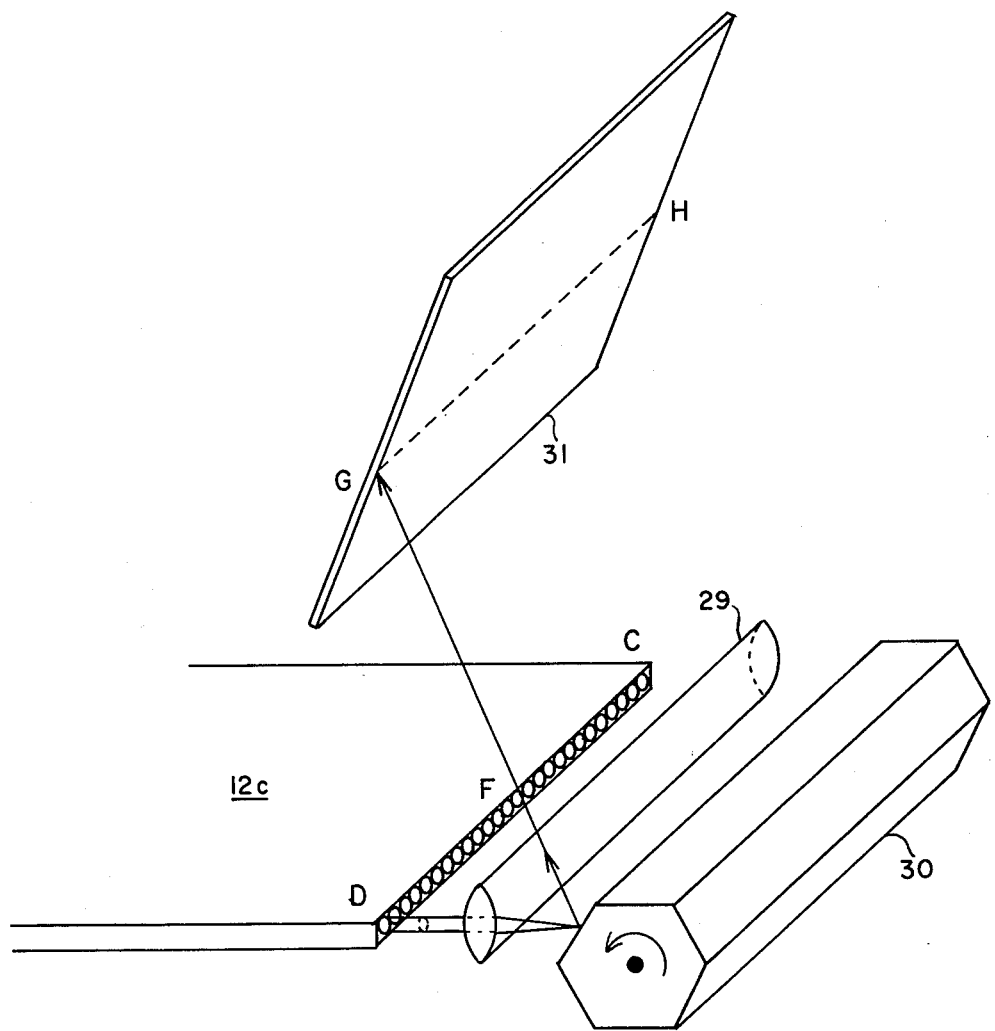
FIG. 6 shows the present invention utilized in an alternative embodiment to provide flat field scanning.

In an alternative embodiment of the invention, modulated light exiting end C, D, F of fiber optic bundle is not applied to a xerographic drum, but rather is applied via a lens and a polygonal mirror to a large screen deflection system, as is shown in FIG. 6 and described in detail further in this specification.

There is a problem with this technique of converting the conical scan to a very linear scan in that the deflected light beam 25 performing the conical scan, as represented by circle 26 in a counter clockwise direction, does not always impinge upon the ends of the individual fibers 24 making up the fiber optic bundle. Accordingly, I solve this problem by providing a fiber optic feedback path which I now describe.

In accordance with the teaching of my invention, I provide two additional fiber optic bundles 23a and 23b which are fabricated in the same manner as bundle 12c but are only one or two fiber layers deep. Bundles 23a and 23b may be separately wound from bundle 12c or may be concurrently wound. For concurrent winding in the winding process bundle or blanket 23b may first be wound on drum 13 in FIG. 1. With or without cutting fuber strand 11, the winding process is stopped and the one or two layer thick bundle is coated with the flexible coating to hold blanket or bundle 23b together. After the coating is dry, a layer of paper, plastic or other material may or may not be wrapped around the winding for bundle 23b and the winding process is then restarted to wind blanket or bundle 12c on top of bundle 23b with or without the layer of paper, plastic or other material. After bundle 12c is wound, the winding process is again stopped with or without cutting fiber 11. After coating with the flexible material to hold the fibers in the bundle, another paper, plastic or other material may or may not be placed over the winding for bundle 12c. Again the winding process is restarted and bundle or blanket 23a is wound over the top of bundle 12c. A flexible coating is also applied to bundle 23a to hold the fibers in positional relationship in the bundle. Finally, the longitudinal cut or slit through the fibers of bundles 23b, 12c and 23a is made as previously described only for winding 12c and the three windings are removed from drum 13. As shown in FIG. 4, one of the slit ends of all three bundles are kept together and wrapped around and fastened to the ring-shaped member, previously described, and then the ends of the fibers in bundles 23b, 12c and 23a wrapped around the ring-shaped member are polished in a manner well known in the art. The final assembled form of bundles 12c, 23a and 23b are shown in FIG. 4. The other ends of bundles 23a, 23b and 12c are separated. The ends C, F, D of bundle 12c are captured between the flat members as previously described and polished. The ends of bundles 23a and 23b are each gathered together in a bunch and the ends are polished.

In FIG. 5 fiber optic bundles 23a and 23b also are not shown in detail as in FIG. 4. Rather they are depicted as shown in FIG. 5 for ease of representation. The ends formed in a circle along with ends A, E, B of bundle 12c are only shown as ends, with the remainder of bundles 23a and 23b being representatively shown by a few optic fibers having ends 27 and 28 respectively.

Light exiting any of the bunched ends of bundles 23a and 23b is input to photocells 22a and 22b respectively for the feedback. Lenses or other means known in the art may also be implemented as necessary to focus light output from optic fiber bundles 23a and 23b onto photocells 22a and 22b respectively.

Photocell 22a detects any light in any one of the individual fibers of fiber optic bundle 23a. Similarly, photocell 22b detects light in any one of the fibers of bundle 23b. The outputs of photocells 22a and 22b are applied to feedback circuit 21 which generates a feedback signal that is applied to deflection drive circuit 20 to modify the conical scan represented by light ray 25.

In the event that the diameter of the circular base of the cone traced by the conical scan by beam 25 deviates from the diameter of the circle formed by the ends 24 of the fiber optic bundle 12c, beam 25 no longer fully impinges upon the ends 24 of the fiber optic bundle 12c. Due to the finite diameter, in the order of a few thousandths of an inch, of beam 25 the beam will impinge not only upon ends 24 of bundle 12c but will also impinge upon ends 27 of auxiliary fiber optic bundle 23a. This is sensed by photocell 22a which provides a signal to feedback circuit 21 which in turn changes its output signal which is input to deflection circuit 20. The result is that the drive signal applied to piezoelectric deflection circuit 17 is decreased a small amount causing the deflection of optic fiber 18 to decrease a small amount so that the diameter of the circle traced by beam 25 decreases. This results in beam 25 impinging only on the ends 24 of fiber optic bundle 12c. Similarly, if beam 25 traces a smaller circle it will impinge on both ends 24 of fiber optic bundle 12c and ends 28 of auxiliary fiber optic bundle 23b. This is detected by photocell 22b which causes feedback circuit 21 to change its output signal to deflection drive circuit 20. Deflection drive circuit 20 responds thereto to increase the drive signal applied to piezoelectric deflection circuit 17 to deflect optic fiber 18 a greater amount so that beam 25 impinges only upon ends 24 of fiber optic bundle 12c. Similarly, an out of round trace, that is a trace that impinges on end 24 for only part of a circle, is detected and a correction signal is generated by feedback circuit 21 that causes deflection circuit 17 to drive fiber 18 and mirror 19 so that reflected beam 25 impinges only on ends 24 of bundle 12c.

The operation of the circuit just described provides for an ultra-linear light scan, does not utilize motor drives, polygonal mirrors or other complex, expensive electromechanical hardware, and is self adjusting.

In FIG. 6 is shown an alternative embodiment of the invention. Rather than having light exiting from the ends of the optical fibers of bundle 12c impinging upon a xerographic drum, the modulated light is manipulated in the manner now described to produce full field scanning on a surface. As previously described, and with reference to FIG. 6, linear scanning is produced with modulated light exiting fibers of bundle 12c starting at corner D and progressing uniformly across bundle 12c to corner C. Modulated light exiting ends D, F, C of bundle 12c is first focused to a point as it passes through lens 29 and the point is at one of the surfaces of polygonal mirror 30. Following optic laws, the focused light beam is reflected from mirror 30 with the angle of incidence equalling the angle of reflection. The reflection causes the modulated light beam to fall upon flat surface 31. As represented in FIG. 6, the light beam exiting the optical fiber at corner D of bundle 12c hits point G on surface 31. As the optical fibers of bundle 12c are scanned as previously described, the focused light beam reflected from polygonal mirror 30 scans across surface 31 from point G to point H.

To scan another line adjacent to line GH and surface 31, polygonal mirror 30 is incrementally rotated a small amount (by apparatus not shown) which changes the angle of incidence of the light beam on mirror 30. After each scan polygonal mirror 30 is rotated a small amount. In this manner the entire surface is scanned. With polygonal mirror 30 rotated counter clockwise, as shown by the arrow in FIG. 5, the light beam will scan from top to bottom of surface 31. Those skilled in the art may add other mirrors and lenses to the simple flat surface scanner in FIG. 6 or may design many other optical systems requiring linear light scanning apparatus such as provided by my invention.

It will be obvious to one skilled in the art that modifications may be made in the embodiments just described without departing from the spirit and scope of the invention now claimed.

I claim:

1. In a scanning optical system including a collimated light beam, means for deflecting said beam periodically over a predetermined non-linear path and including means for continuously controlling the deflection of said beam comprising:
    means for continuously sensing when said beam is being deflected over a path deviating from said predetermined non-linear path over substantially the entire length of said path; and
    means responsive to said sensing means for continuously generating a feedback signal which is continuously applied to said deflecting means causing it to substantially simultaneously change the deflection path so that said light beam continuously traces said predetermined non-linear path.

2. A scanning optical system comprising:
    a collimated light beam source;
    means for intensity modulating said light beam to carry information;
    means for reflecting said light beam periodically over a fixed conical path;
    means for generating a first signal which is applied to said reflecting means causing said light beam to be reflected over said fixed path;
    a bundle of fiber optic fibers arranged so that one end of each of the fibers in said bundle forms a circle and so that the other ends of the fibers are arranged in a straight line, said reflected light beam tracing said fixed path sequentially impinging on the one end of each of said fibers arranged in a circle and exiting said bundle at the other end of said fibers arranged in a straight line creating linear optical scanning with said light beam;
    means for continuously sensing over the entire length of said path when said beam is being reflected by said reflecting means over a path deviating from said fixed conical path; and means responsive to said sensing means for continuously generating a feedback signal which is applied to said first signal generating means causing said first signal to be continuously and substantially simultaneously modified so that said reflected light beam traces said fixed path.

3. The invention in accordance with claims 1 or 2 wherein said sensing means comprises:

sensor means located adjacent the fixed path over which said light beam is deflected and providing an indication when said light beam deviates from said fixed path; and detector means responsive to the indication from said sensor means to generate a first signal indicating that said light beam is being deflected over a path deviating from said fixed path.

4. The invention in accordance with claim 3 wherein said sensor means comprises light conductive means located adjacent the fixed path of said light beam, said light conductive means conducting light from said beam when said beam is deflected over a path deviating from said fixed path.

5. The invention in accordance with claim 4 wherein said light conductive means comprises:

first fiber optic means located adjacent to one side of said fixed path and conducting light from said beam when said beam deviates from said fixed path to said one side thereof; and second fiber optic means located adjacent to another side of said fixed path and conducting light from said beam when said beam deviates from said fixed path to said another side thereof.

6. The invention in accordance with claim 2 further comprising:

a mirror upon which said light beam exiting said fiber optic bundle impinges and is reflected;

display means upon which said light beam reflected from said mirror impinges; and means for moving said mirror after said light beam exiting said fiber optic bundle has completed a scan thereby causing said light beam reflected from said mirror to scan an area on said display means.

* * * * *